S. GECZYNSKI.
GRIPPING DEVICE FOR USE IN CONNECTION WITH TABLE BOARDS.
APPLICATION FILED JAN. 11, 1921.
1,432,597.
Fig. 1
Patented Oct. 17, 1922.
2 SHEETS—SHEET 1.
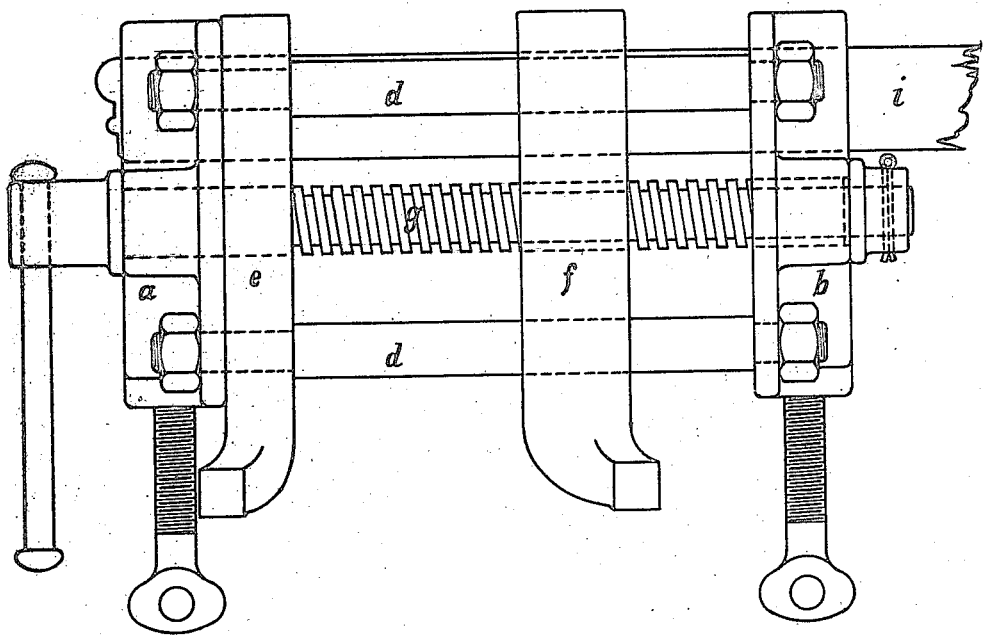
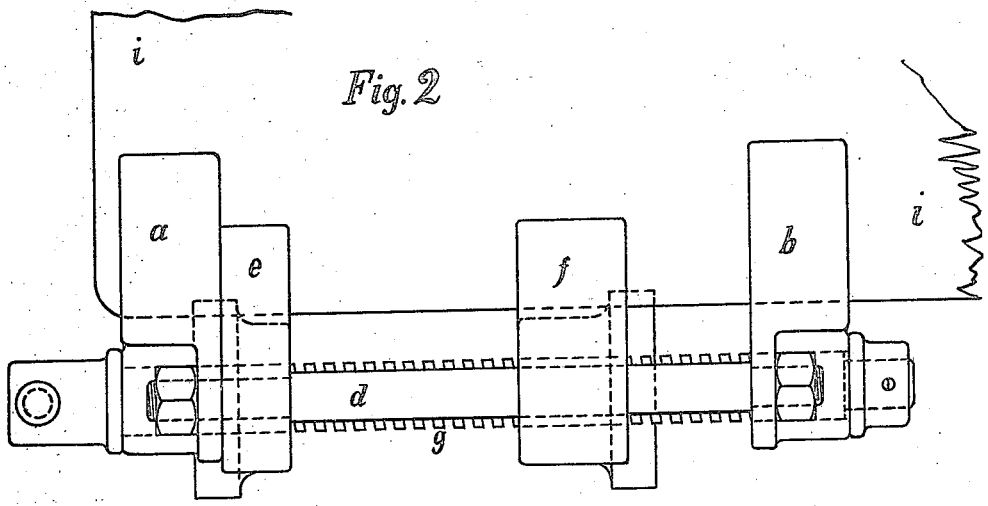
Fig. 2
Inventor-
Samuel Geczynski
By B. Singer,
Atty.

S. GECZYNSKI.
GRIPPING DEVICE FOR USE IN CONNECTION WITH TABLE BOARDS.
APPLICATION FILED JAN. 11, 1921.

1,432,597.

Patented Oct. 17, 1922.
2 SHEETS—SHEET 2.

Inventor:
Samuel Geczynski,
By B. Singer.
Atty.

Patented Oct. 17, 1922.

1,432,597

UNITED STATES PATENT OFFICE.

SAMUEL GECZYNSKI, OF BERLIN, GERMANY.

GRIPPING DEVICE FOR USE IN CONNECTION WITH TABLE BOARDS.

Application filed January 11, 1921. Serial No. 436,611.

*To all whom it may concern:*

Be it known that I, SAMUEL GECZYNSKI, a citizen of the German Republic, and resident of Berlin, Germany, have invented certain new and useful Improved Gripping Devices for Use in Connection with Table Boards (for which I filed an application in Germany on June 12, 1919), of which the following is a specification.

The vise which generally is employed as gripping tool allows only of holding small work-pieces in a suspended position, but does not permit of making use also of the table-board as support or carrier for the work-piece, because the threaded spindle and its guide-piece are in the way. Furthermore, owing to the spindle of the vise extending crosswise to the table-board, the gap between the jaws can have but a moderate size.

The present invention relates to a gripping-device which is of simple construction, may be employed in a variety of manners, and allows of making use of the table-board as support or carrier for the work-piece; it allows also of providing a wide gap which is adapted to receive rather broad work-pieces, such as wooden boards, but also comparatively large metallic objects; it is apt to serve, in small work shops and in domestic workshops, as a substitute for a joiner's or lock-smith's bench.

My invention consists of certain arrangements and combination of parts, as are fully described hereinafter, and in order to make my invention clear, I refer to the accompanying drawings, in which similar letters denote similar parts throughout the several views, and in which:

Fig. 1 is a front-view of a gripping-device constructed according to my invention;

Fig. 2 is a plan of it;

Referring to Figs. 1 and 2, *a* and *b* are two relatively fixed members which are arranged to receive and to be clamped to the front-edge of a table-board and which are connected with each other by two bars *d d* which extend parallel to said edge in front of it and below the plane of the upper surface of said board. The bars *d d* serve as carriers for the gripping-jaws *e* and *f*, of which *e* is firmly connected with the member *a*, whereas the jaw *f* may be displaced upon and along the said bars. This displacement is effected by means of a screw-threaded spindle *g* which passes through a correspondingly threaded hole of the jaw *f* and is supported in the members *a* and *b*. The gripping-jaws may be inverted, that is to say, their lower ends may be made the upper ones, and reversely according to the nature of the work-piece to be gripped thereby. Each end of each jaw is appropriately shaped so as to be capable of gripping work-pieces of various configurations. The table-board piece between the jaws remains always free for the reception of the respective work-piece. The bars *d d* and the spindle *g* may be exchanged for longer ones so that the device may be made apt to grip also particularly long work-pieces, at least one of the members *a*, *b* being then appropriately displaced along the rim of the table-board.

Figure 3:
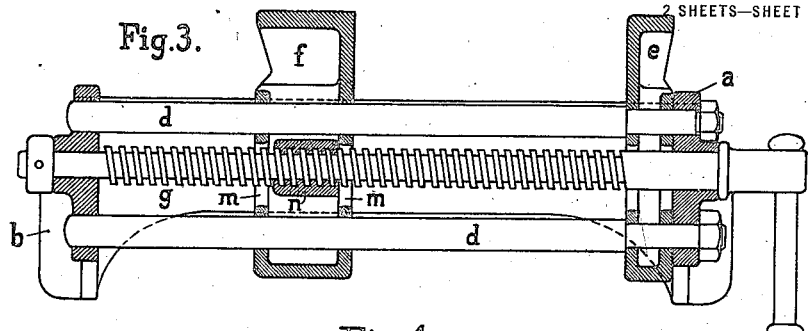
Fig. 3 is a representation similar to Fig 1, showing a slightly modified form of construction.
Figure 4:
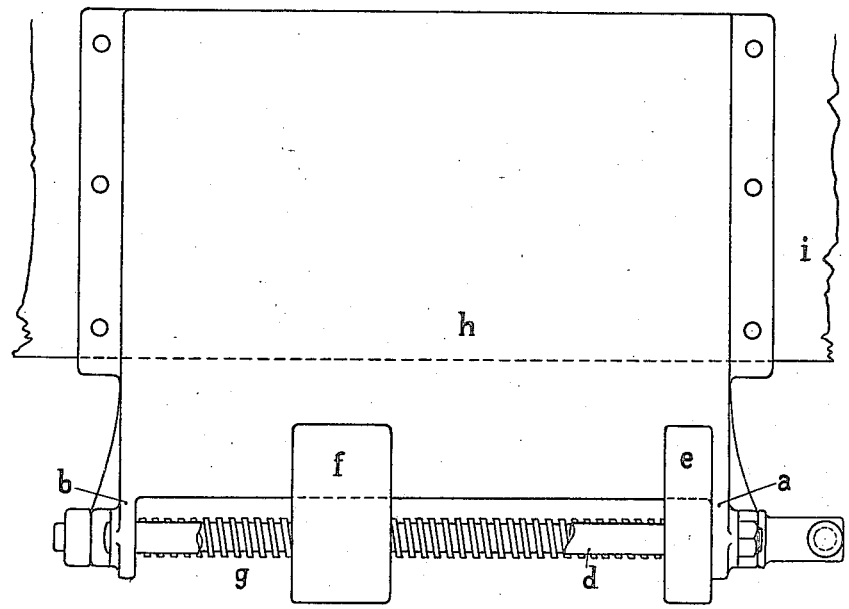
Fig. 4 is a plan of this modified form of construction.
Figure 5:
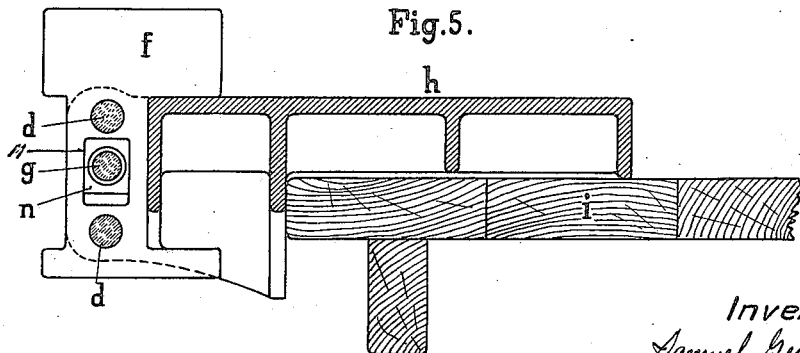
Fig. 5 is a vertical cross-section through the same.

In the form of construction shown in Figs. 3–5, the possibility of displacing one or the other of the members *a*, *b* is dispensed with; in fact, the members *a*, *b* themselves are form extensions of a horizontal plate forming a surface-and bearing-plate *h* for the work-piece to be dealt with and being affixed to the table-board by any desired means. The work-piece, for instance a wooden board or the like, is placed upon said plate *h* and is clamped in between the gripping-jaws again by turning the threaded spindle *g*. This latter is in the form of construction in question arranged not exactly in the middle between the two guide-bars *d d*, but nearer to the upper guide-bar so as to increase the gripping power of the moveable jaw *f*. The stationary jaw *e* which in the form of construction represented in Figs. 3 and 4 is screwed to the lug *a* of the plate h, may if desired or preferred, be formed as a member similar to the member *a* or *b* of Figs. 1 and 2, i. e. as a clamping-bow contributing in affixing the plate *h* to the table-board. The jaws *e* and *f* are hollow, or box-like respectively, and where the spindle *g* passes through them, slots *m* are provided, the length of which is such that the jaws may be inverted notwithstanding that the spindle is not exactly midway between the guide-bars *d d*. The threaded hole through which the spindle passes is provided in this instance not in the jaw $f$, but in a nut $n$ arranged in said jaw, the arrangement being such that the power may be transmitted to the jaw $f$ when the latter is in either of its positions.

The gripping surfaces of the jaws may be unsymmetrically subdivided and they may be provided with special linings as customary with the jaws of vises.

Having now described my invention, what I desire to secure by a patent of the United States is:

1. A gripping device for use in connection with a table-board, comprising a pair of gripping jaws, guide bars on which said jaws are mounted, supporting means for said bars having means for attachment to one end of a table-board to dispose the said bars at planes below that of the upper surface of the table-board, and a screw shaft mounted in said supporting means and engaged with one of said jaws to operate the same, said screw shaft being also arranged below the said plane of the upper surface of the table-board, said gripping jaws being reversible.

2. A gripping device for use in connection with a table-board, comprising a pair of gripping jaws, guide bars on which said jaws are mounted, supporting means for said bars having means for attachment to one end of a table-board to dispose the said bars at planes below that of the upper surface of the table-board, and a screw shaft mounted in said supporting means and engaged with one of said jaws to operate the same, said screw shaft being also arranged below the said plane of the upper surface of the table-board, said gripping jaws being reversible and being provided with slots through which said screw shaft extends, one of said jaws being hollow, and a nut in said hollow jaw and engaging said screw shaft.

In testimony whereof I affix my signature in presence of two witnesses.

SAMUEL GECZYNSKI.

Witnesses:
Dr. BINNY WIMANN,
DORA GRANZOW.